United States Patent [19]

Borchert

[11] Patent Number: 4,849,105

[45] Date of Patent: Jul. 18, 1989

[54] APPARATUS FOR REMOVING SOLID PARTICLES FROM COOLING WATER

[75] Inventor: Werner Borchert, Mülheim, Fed. Rep. of Germany

[73] Assignee: GEA Energiesystemtechnik GmbH & Co., Fed. Rep. of Germany

[21] Appl. No.: 110,747

[22] PCT Filed: Nov. 17, 1986

[86] PCT No.: PCT/EP86/00664

§ 371 Date: Aug. 11, 1987

§ 102(e) Date: Aug. 11, 1987

[87] PCT Pub. No.: WO87/03505

PCT Pub. Date: Jun. 18, 1987

[30] Foreign Application Priority Data

Dec. 11, 1985 [DE] Fed. Rep. of Germany ..... 85202049

[51] Int. Cl.⁴ ............................................ B07B 1/06

[52] U.S. Cl. .................................... 210/408; 210/411; 210/412; 210/413; 210/415; 210/497.3; 210/772; 209/250; 209/273; 209/281; 209/380

[58] Field of Search ............... 210/772, 408, 411, 412, 210/413, 415, 497.3; 209/380, 250, 273, 281

[56] References Cited

U.S. PATENT DOCUMENTS 4,130,478 12/1978 Swallow ............................ 209/254

FOREIGN PATENT DOCUMENTS 240837 11/1986 Fed. Rep. of Germany ... 210/497.3

2564745 11/1985 France .

*Primary Examiner*—David L. Lacey

*Assistant Examiner*—Thi Dang

*Attorney, Agent, or Firm*—Townsend and Townsend

[57] ABSTRACT

An apparatus for removing solid particles from cooling water having a tubular housing (1), a funnel-shaped trap sieve (4) attached to the inner housing wall with the tip facing in the flow direction, and a pressurized water sprayer (11). The sprayer includes a washer arm (14), concentrally rotatable about the downstream side (23) of trap sieve (4), and having at least one slit nozzle (15) directed toward the downstream surface (23). A suction tube (8) extends into a collecting chamber (10) of trap sieve (4). To prevent large particles from jamming rotating components, trap sieve (4) is cleaned by spraying water only against the downstream side. The tip of the sieve is defined by a cylindrical container (5) having a closed bottom (6). The intake end (9) of suction tube (8) extends into the container. Wash water is introduced into washer arm (14) through an inner end fixedly attached to a hollow flange (13) mounted on a rotary shaft (12) of pressurized spray apparatus (11). The hollow flange has a rim (19) in direct communication with a bearing defined by a wash water distribution chamber connected to a wash water inlet conduit and fixedly mounted to the housing.

9 Claims, 2 Drawing Sheets

APPARATUS FOR REMOVING SOLID PARTICLES FROM COOLING WATER

BACKGROUND OF THE INVENTION

The invention relates to an apparatus for removing solid particles from the cooling water for power plants and the like. It has a tubular housing and, attached to its interior, a funnel-shaped trap sieve, the pointed end of which extends in the flow direction. A pressurized water sprayer includes a washer arm concentrically rotatable about the downstream side of the sieve. The arm has at least one discharge nozzle facing the downstream side of the sieve. Further, a suction tube extends into a collecting chamber of the sieve.

Large quantities of water are required to cool heat exchangers in steam-operated and other types of power plants. The cooling water must be cleaned regularly to prevent solid particles therein, such as wood, plastic, leaves, blades of grass, shells and the like from clogging and damaging parts of the plant. The larger particles are removed by means of rakes. However, the finer particles are typically removed with trap sieves by suctioning them off the upstream side of the sieve. To dislodge and remove particles which adhere to and clog trap sieve perforations, the prior art employs suction arms as is disclosed, for a cylindrical trap sieve, in U.S. Pat. No. 2,275,958, and for a funnel-shaped sieve, in German Utility Model No. DE-GM 83 37 300. Such arms have suction slots which rotate proximate the upstream side of the trap sieve. These constructions have proven disadvantageous because larger particles, e.g. wood, shells, etc. frequently jam the suction arm as it rotates about the upstream side of the trap sieve, thus rendering the arm, or the arm together with the trap sieve inoperable. This distinct disadvantage is also encountered with a commercially well-known apparatus, which has, in addition to a suction arm rotatable about the upstream side, a washer arm at the downstream side of the sieve positioned opposite the suction arm and rotating therewith. In this construction pressurized water is sprayed through nozzle slits against the downstream side of the sieve to clean the sieve perforations. Moreover, a construction incorporating both a suction arm rotating about the upstream side of the sieve and a washer arm rotating about the downstream side is very costly.

SUMMARY OF THE INVENTION

It is therefore an object of the present invention to provide an apparatus of the above mentioned kind in which jamming of the suction apparatus on the upstream side of the trap sieve is eliminated.

This is achieved in accordance with the present invention by constructing the pointed end of the sieve as a cylindrical container having a water impervious end and extending the intake of a suction tube into the container.

A distinct advantage of the present invention is the absence of any rotating components on the upstream side of the trap sieve which might become jammed by large particles, which could result in serious damage. Only a stationary suction tube is located on the upstream side of the sieve while a rotatable washer arm is located on the downstream side. Since large particles cannot penetrate the trap sieve, they cannot damage the rotatable arm. Heretofore, it was assumed that an effective suctioning of dirt particles can only be achieved by positioning the suction tube as close as possible to the upstream surface of the sieve and rotating it with the washer arm on the downstream side to loosen particles adhering to the sieve and wash them directly into the suction tube intake.

Applicant has discovered, however, that by properly constructing the pointed sieve end and properly positioning a stationary suction tube, at least equivalent results are obtained. Such a device is simpler to construct and does not involve the risk of particles jamming or clogging movable components.

When cleaning the sieve at prescribed intervals in accordance with the degree of particle accumulation, the washer arm is rotated proximate the downstream or outer surface of the trap sieve, preferably pulsating pressurized wash water against the downstream surface. Wash water penetrates the sieve and rinses the adhering particles to the upstream side of the sieve. From there they are drawn the spiraling cooling water carries them into the chamber defined by the cylindrical container and they are removed therefrom with the suction tube.

Suctioning of dirt particles from the chamber is optimized by positioning the intake end of the suction tube at about the level of the cylindrical container opening. For efficiently flowing wash water to the washer arm, the inner end of the washer arm is attached to a hollow flange coupled to a rotary shaft of the pressurized spray apparatus. The flange further includes a rim which is journaled in a bearing defined by a distribution chamber connected to the wash water supply pipe. A hollow counter-arm, attached to the flange on the rotary shaft opposite the washer arm, is fluidly connected therewith with semicircular tubes to ensure that pressurized wash water is uniformly discharged over the entire length of the slit nozzle in the washer arm. The semicircular tubes further enhance the stability of the rotating arms.

The form of the slit nozzle may vary depending upon the type of particles trapped by the sieve. Granular particles require a washer arm that has an elongated slit extending along the downstream surface of the sieve from the bottom of the cylindrical chamber to about the outer rim of the sieve. When fibrous particles are trapped, a plurality of nozzle slits on the washer arm are more suitable. These are disposed diagonally to the arm's longitudinal axis and extend along the downstream stream surface of trap sieve from the bottom of the chamber to about the sieve's outer rim.

BRIEF DESCRIPTION OF THE DRAWINGS

An embodiment of the invention is shown in the accompanying drawings, in which.

DESCRIPTION OF THE PREFERRED EMBODIMENT

Figure 1:
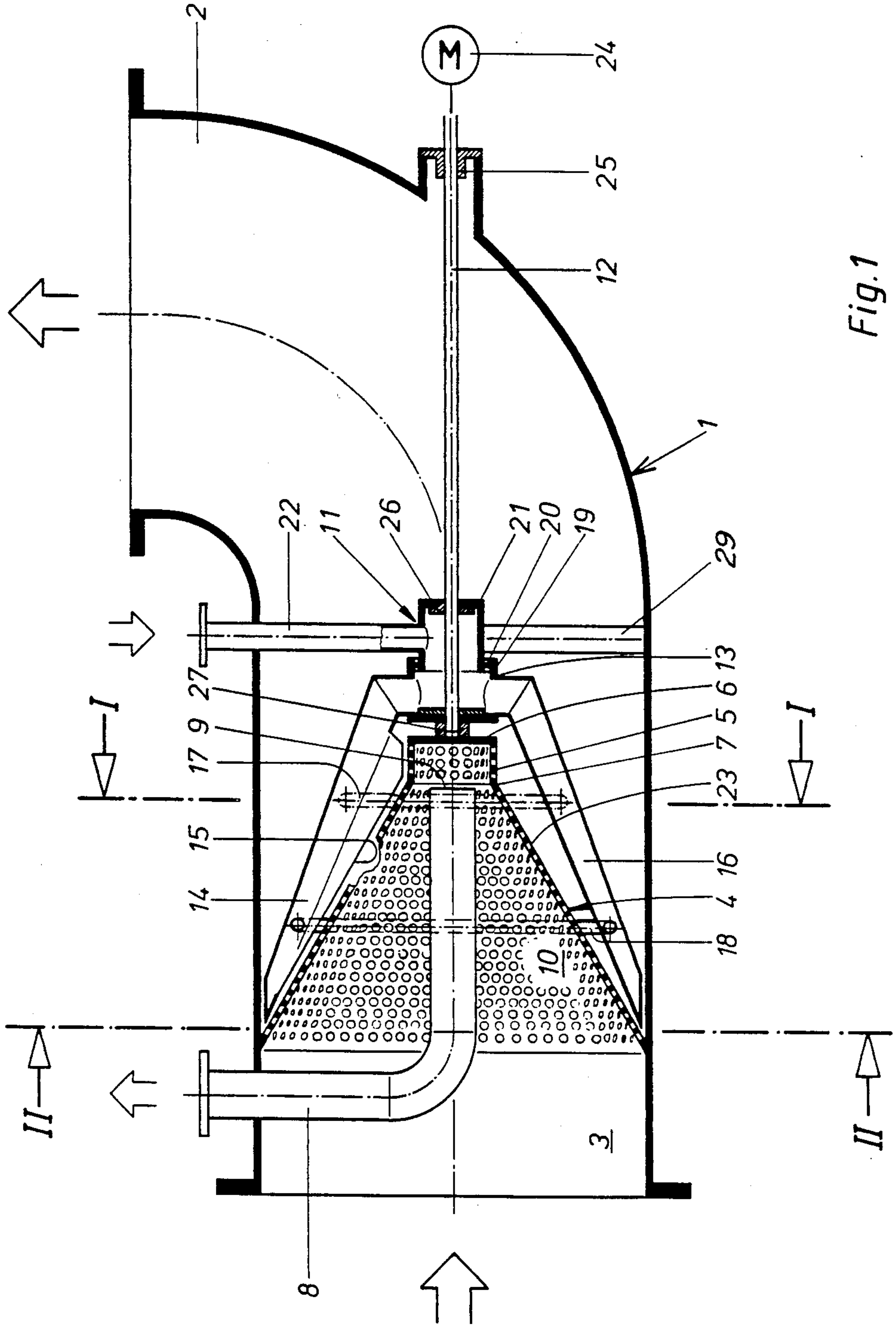
FIG. 1 is a longitudinal cross-section of an apparatus for removing particles from cooling water.

The apparatus of FIGS. 1-4 functions to remove particles from a cooling water system for power plants and the like. It includes a tubular housing 1 mounted inside a cooling water conduit with end flanges affixed to corresponding pipes. The illustrated embodiment employs a housing 1 with an elbow 2. However, a linear housing can equally be used which only requires that the drive be correspondingly modified.

A funnel-shaped trap sieve 4 is mounted inside housing 1 for trapping particles entrained in the cooling water. The sieve extends across the entire diameter of housing 1, its rim is affixed to an inner wall 3 of housing 1 and its pointed end or tip faces in the flow direction to form a collecting chamber 10 inside sieve 4. The tip of trap sieve 4 is defined by a cylindrical container 5 which has a perforated outer mantle and a water impervious bottom 6.

To suction off particles trapped in the container, an intake end 9 of a suction tube 8 extends axially into the funnel-shaped trap sieve to about the level of the container opening 7. Upstream of sieve 4 the suction tube 8 is bent 90° and extends radially outward through housing 1 where it is connected to a suction pump (not shown). Particles transported by the cooling water into the collecting chamber 10 are trapped by sieve 4 and diverted into container 5. The suction pump is intermittently activated as particles accumulate, although it may be operated continuously should that be needed.

During operation particle accumulations gradually clog trap sieve 4 and it must be cleaned at regular intervals. For this purpose a pressurized spray apparatus is mounted on the downstream side of sieve 4. The main component of the pressurized spray apparatus 11 is a washer arm 14, which rotates proximate the outer, downstream surface 23 of sieve 4 and sprays pressurized wash water against downstream surface 23. This forces particles adhering to sieve 4 back into collecting chamber 10, where they accumulate in container 5 from which they are suctioned off. The washer arm 14 extends over the full length of sieve 4, including the cylindrical mantle of container 5, is hollow and has an elongated split nozzle 15 which also extends along the downstream surface 23 from the bottom 6 of container 5 to about the outer rim of sieve 4. Washer arm 14 is connected to a hollow flange 13 mounted on a rotating shaft 12 which passes concentrically with the central axis of sieve 4 through elbow 2 in housing 1. The inner end of the shaft is journaled in a bearing 27 fixedly attached to bottom 6 of container 5. A rim 19 of flange 13 engages a bearing 20 defined by a stationary wash water distribution chamber 21 which is connected to a wash water conduit 22. Distribution chamber 21 is fixedly mounted to housing 1 by wash water conduit 22 and a brace 29 positioned diametrically opposite thereto. Rotary shaft 12 extends through chamber 21 and is further supported by bearings 25 of elbow 2 and bearing 26 on chamber 21. A motor 24 is provided to drive rotary shaft 12. Flange 13 and stationary chamber 21 and flange 13 divert pressurized wash water to rotating washer arm 14. To stabilize washer arm 14 and to optimize the flow of wash water over the full length of slit nozzle 15, a hollow counter arm 16 is mounted on flange 13 opposite washer arm 14. The hollow interiors of both washer arm 14 and counter-arm 16 are fluidly connected with semi-circular tubes 17,18.

When trap sieve 4 is clogged the pressurized water spray apparatus is activated, i.e. it is rotated by motor 24 charged with wash water by conduit 22, pressurized so as to obtain a flow rate through slit nozzle 15 of about 10 m/sec. Wash water is fed directly into washer arm 14 via flange 13, though water may also enter through hollow counter arm 16 and semi-circular tubes 17, 18. Improved rinsing action can be achieved by pulsating the spray. Washer arm 14 is rotated about trap sieve 4 one or more times, depending upon the desired degree of cleanliness.

Figure 4:
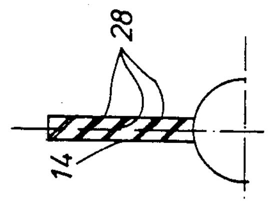
FIG. 4 is a plan view of a washer arm corresponding to FIG. 3 but with modified nozzle slits.
Figure 3:
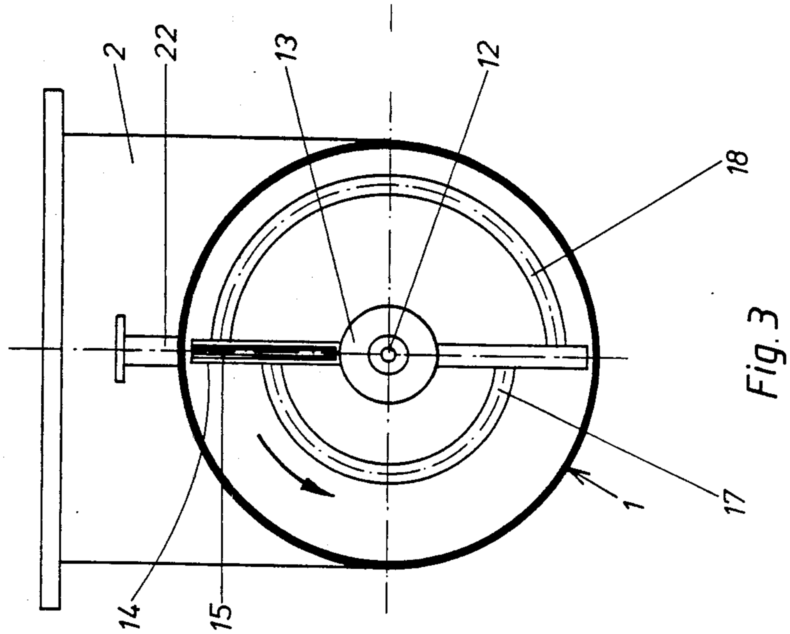
FIG. 3 is a cross-section of the apparatus without the sieve, and is taken on line II—II of FIG. 1.
Figure 2:
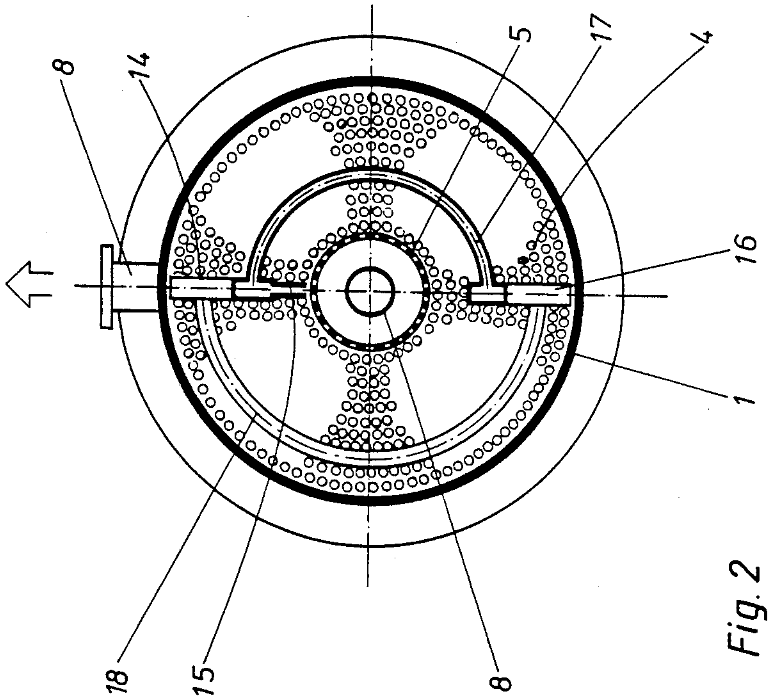
FIG. 2 is a cross-section of the apparatus and is taken on lines I—I of FIG. 1.

When fibrous particles, such as algae are removed from the cooling water the elongated slit nozzle 15 shown in FIG. 3 is preferably replaced by a plurality of slit nozzles 28 which are disposed diagonally to the longitudinal axis of washer arm 14, as schematically shown in FIG. 4. When a linear housing is used instead of a housing 1 with elbow 2, the rotary shaft 12 is conventionally driven with a miter gear.

I claim:

1. An apparatus for removing particulate contaminants from a water flow flowing in a direction from upstream toward downstream comprising:

a tubular housing through which the water flow flows from an upstream end to a downstream end;

a funnel-shaped sieve having a central axis and affixed to an interior wall of the housing, the sieve having a rim formed upstream and extending across the entire diameter of the housing and terminating at a tip formed downstream of the rim, the tip defined by a substantially cylindrical container having a water-impervious base positioned substantially perpendicular to the central axis of the sieve;

a washer arm rotatably mounted in the housing downstream of the sieve, in close proximity thereto and having at least one slit nozzle in close proximity to and directed toward a downstream side of the sieve;

means for supplying the washer arm with wash water; and a suction tube disposed in the housing within the sieve, on an upstream side thereof and having an intake opening in fluid communication with the container so that pressurized wash water discharged by the slit nozzle dislodges particulate contaminants entrapped on the sieve into to collect the contaminants which are to be withdrawn therefrom by the suction tube.

2. An apparatus according to claim 1 wherein the intake opening of the suction tube is located at about an intersection between the funnel-shaped sieve and the cylindrical container.

3. Apparatus according to claim 1 wherein the slit nozzle in the washer arm is elongated and extends over the substantially full length of the downstream side of the sieve from about the bottom base of the cylindrical container to an upstream end of the sieve.

4. Apparatus according to claim 1 wherein the at least one slit nozzles comprises a plurality of slit nozzles in the washer arm, the slit nozzles being disposed diagonally to a longitudinal axis of the arm and facing substantially towards a downstream side of the sieve.

5. An apparatus according to claim 1 wherein the sieve includes a circular cross-section at the rim and wherein water flow enters the sieve across the entire cross-section.

6. An apparatus for removing particulate contaminants from a water flow flowing in a direction from upstream toward downstream comprising:

a tubular housing through which the water flow flows from an upstream end to a downstream end;

a funnel-shaped sieve having a central axis and affixed to an interior wall of the housing, the sieve having a rim formed upstream extending across the entire diameter of the housing and terminating at a tip formed downstream of the rim, the tip defined by a substantially cylindrical container having a water-impervious base positioned substantially perpendicular to the central axis of the sieve;

a washer arm rotatably mounted in the housing downstream of the sieve, in close proximity thereto and having at least one slit nozzle in close proximity to and directed toward a downstream side of the sieve;

means for supplying the washer arm with wash water;

a suction tube disposed in the housing on an upstream side of the sieve and having an intake opening in fluid communication with the container so that pressurized wash water discharged by the slit nozzle dislodges particulate contaminants entrapped on the sieve into the container to collect the contaminants which are to be withdrawn therefrom by the suction tube; and wherein the means for supplying wash water includes a wash water distribution chamber in fluid communication with a wash water supply tube and fixedly mounted on the interior of the housing concentrically with the central axis of the sieve, the chamber defining a cylindrically open end disposed downstream of the container base and facing the container base, a hollow flange mounting and in fluid communication with the washer arm and having an annular rim rotatably engaging the cylindrically open end of the chamber, and a rotatable shaft operatively connected with the hollow flange and the washer arm, so that wash water flows from the supply tube via the distribution chamber to the hollow flange and the washer arm while the shaft rotates the washer arm about the downstream side of the sieve.

7. Apparatus according to claim 6 including a hollow counter-arm attached to and fluidly communicating with the hollow flange, the counter-arm being located substantially opposite the washer arm for rotation therewith when the shaft is rotated, and including at least one, substantially semicircular tube in fluid communication with the hollow arm and the washer arm and positioned thereon at a point upstream from the hollow flange to facilitate an even supply of wash water over the full length of the washer arm.

8. An apparatus for removing particulates from a water flow comprising a tubular housing, a funnel-shaped sieve mounted to the housing and having a rim extending across the entire diameter of the housing and having a sieve surface converging in a downstream direction, the downstream end of the sieve being defined by a substantially cylindrical container of a diameter substantially less than a diameter of the housing and having a water-impervious, substantially circular base; a wash water distribution chamber arranged co-axially with the sieve and fixedly mounted to the housing, the chamber having a cylindrical open end facing and closely spaced from the impervious base; a washer water arm including a hollow flange in fluid communication with an interior of the arm disposed on a downstream side of the sieve and extending substantially over the full axial length thereof, and having slit nozzles in close proximity to and directed toward the downstream side of the sieve, the flange including an annular rim rotatably engaging the cylindrical open end of the distribution chamber to establish fluid communication between the chamber, the interior of the hollow flange and the interior of the arm while permitting rotation of the flange and the arm about the chamber; means including a concentric shaft operatively coupled with the hollow flange and journalled so that upon rotation of the shaft the flange and the washer arm rotate with the shaft; drive means for rotating the shaft; means for supplying wash water to the distribution chamber; whereby contaminants accumulating on the sieve can be dislodged therefrom by activating the drive means to rotate the shaft, and therewith the washer arm, and by flowing pressurized wash water into the distribution chamber and hence through the washer arm and the slit nozzles against the sieve so that the dislodged contaminants are backwashed to the upstream side of the sieve and collect in the cylindrical container of the sieve; and a suction tube having an intake positioned in close proximity to the cylindrical container for the removal of dislodged contaminants therefrom when a vacuum is applied to the suction tube.

9. An apparatus for removing particulate contaminants from a water flow flowing in a direction from upstream toward downstream comprising:

a tubular casing through which the water flow flows from an upstream end to a downstream end;

a funnel-shaped sieve having a central axis and secured to an interior wall of the housing, the sieve defining a collecting chamber formed therein and having a rim formed upstream and extending across the entire diameter of the housing and terminating at an apex formed downstream of the rim, the apex defined by a substantially cylindrical container having a water-impervious base positioned perpendicular to the central axis of the sieve;

a washer arm rotatably mounted in the housing downstream of the sieve and having at least one slit nozzle in close proximity to and directed toward a downstream side of the sieve;

a rotating shaft operatively coupled with the washer arm so that upon rotation of the shaft the washer arm rotates with the shaft;

drive means for rotating the shaft; and a suction tube disposed in the collecting chamber and having an intake opening in fluid communication with the container so that pressurized wash water discharged by the slit nozzle dislodges particulate contaminants entrapped on the sieve into the container to collect the contaminants which are to be withdrawn therefrom by the suction tube.

* * * * *